(12) United States Patent
Wang et al.

(10) Patent No.: US 12,354,056 B2
(45) Date of Patent: Jul. 8, 2025

(54) SELECTIVELY PROVIDING MACHINE LEARNING MODEL-BASED SERVICES

(71) Applicant: Maplebear Inc., San Francisco, CA (US)

(72) Inventors: Shuai Wang, Millburn, NJ (US); Zi Wang, Mountain View, CA (US); Ganesh Krishnan, San Francisco, CA (US); Houtao Deng, Sunnyvale, CA (US); Aman Jain, Toronto (CA); Jian Wang, Saratoga, CA (US)

(73) Assignee: Maplebear Inc., San Francisco, CA (US)

( * ) Notice: Subject to any disclaimer, the term of this patent is extended or adjusted under 35 U.S.C. 154(b) by 76 days.

(21) Appl. No.: 17/897,045

(22) Filed: Aug. 26, 2022

(65) Prior Publication Data
US 2024/0070605 A1    Feb. 29, 2024

(51) Int. Cl.
*G06Q 10/083* (2024.01)
*G06N 5/022* (2023.01)
*G06Q 10/0639* (2023.01)
*G06Q 30/0601* (2023.01)

(52) U.S. Cl.
CPC ......... *G06Q 10/0838* (2013.01); *G06N 5/022* (2013.01); *G06Q 10/06393* (2013.01); *G06Q 30/0617* (2013.01)

(58) Field of Classification Search
CPC ......... G06Q 10/0838; G06Q 10/06393; G06Q 30/0617; G06N 5/022
USPC ........................................................ 705/7.39
See application file for complete search history.

(56) References Cited

U.S. PATENT DOCUMENTS

| | | | |
|---|---|---|---|
| 2009/0024544 A1* | 1/2009 | Elliot | B07C 3/00 705/404 |
| 2012/0303541 A1* | 11/2012 | Marcus | G06Q 10/00 705/330 |
| 2015/0073936 A1* | 3/2015 | Peterson | G06Q 30/0282 705/26.9 |
| 2017/0083861 A1* | 3/2017 | Aryeetey | G06Q 10/0833 |
| 2020/0219171 A1* | 7/2020 | Zhuang | G06Q 30/0635 |

(Continued)

OTHER PUBLICATIONS

"The Algorithms That Make Instacart Roll: How Machine Learning And Other Tech Tools Guide Your Groceries From Store To Doorstep" to Rao et al., Mar. 1, 2021 (Year: 2021).*

(Continued)

*Primary Examiner* — Charles Guiliano
*Assistant Examiner* — Po Han Lee
(74) *Attorney, Agent, or Firm* — Fenwick & West LLP (57) ABSTRACT

An online concierge system provides arrival prediction services for a user placing an order to be retrieved by a shopper. An order may have a predicted arrival time predicted by a model that may err under some conditions. To reduce the likelihood of providing the predicted arrival time (and related services) when the arrival time may be incorrect, the prediction model and related services are throttled (e.g., selectively provided) based on one or more predicted delivery metrics, which may include a time to accept the order by a shopper and a predicted portion of late orders that will be delivered past the respective predicted arrival times. The predicted delivery metrics are compared with thresholds and the result of the comparison used to selectively provide, or not provide, the predicted delivery services.

20 Claims, 6 Drawing Sheets

(56) References Cited

U.S. PATENT DOCUMENTS

| | | | |
|---|---|---|---|
| 2020/0372437 A1 | 11/2020 | Kim et al. | |
| 2021/0110341 A1* | 4/2021 | Rehn | G06Q 10/0832 |
| 2021/0142274 A1* | 5/2021 | Berk | G06Q 50/12 |
| 2021/0241211 A1 | 8/2021 | Oprea et al. | |
| 2021/0262817 A1* | 8/2021 | Roherty | G01C 21/3614 |
| 2022/0051181 A1* | 2/2022 | Yacoub | G06Q 10/0833 |
| 2022/0114635 A1 | 4/2022 | Sumida | |
| 2022/0164676 A1* | 5/2022 | McAlister | G06Q 10/0838 |
| 2022/0414592 A1 | 12/2022 | Wang et al. | |
| 2023/0061754 A1* | 3/2023 | Wright | G06Q 10/0833 |

OTHER PUBLICATIONS

De Araujo, A.C. et al. "End-to-end prediction of parcel delivery time with deep learning for smart-city applications," *IEEE Internet of Things Journal*, vol. 8, No. 23, May 3, 2021, 14 pages.

PCT International Search Report and Written Opinion, PCT Application No. PCT/US2023/25217, Oct. 17, 2023, 7 pages.

* cited by examiner

SELECTIVELY PROVIDING MACHINE LEARNING MODEL-BASED SERVICES

BACKGROUND

This disclosure relates generally to selectively providing machine learning model-based services, and in particular to computer software and hardware for determined whether to provide such services when metrics related to the model performance are below a threshold.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse. The shoppers may then coordinate or provide delivery of orders to a user.

Conventional online concierge systems maintain discrete time windows during which orders are fulfilled, and a user selects a specific time window for an order to be fulfilled and delivered to the user. For example, a user selects a time window corresponding to a specific range of times to schedule an order for fulfillment in the future or selects a time window that is an amount of time from a time when the order is placed for the order to be fulfilled as soon as possible. This allows users of an online concierge system to select a specific window for receiving items from an order or to obtain the items in an order within a specified time interval from a time when the order is placed.

The online concierge system may use computer models to aid in predicting delivery times. These predicted delivery times may be used to provide arrival prediction services and/or delivery guarantees to users. For example, the predicted delivery time for an order may be used to provide a level of service to a user placing an order. These predictions, which may be performed for each individual order, may err in predicted arrival times under certain circumstances. These errors may cause the online concierge system to mistakenly predict earlier arrival times for orders than conditions actually allow. As such, users may decide to order with the erroneous predicted delivery, which may cause the online concierge system to receive more orders than it can successfully deliver at the predicted times. Stated another way, when the predicted arrival times from the delivery prediction model err, orders may exceed the capacity of the system to successfully meet the offered level of service (e.g., based on the erroneous predicted arrival time), which may cause orders to fail to meet the delivery time. As such, there may be significant detrimental effects in continuing to use delivery prediction models when the model incorrectly predicts delivery times.

SUMMARY

The online concierge system uses predicted delivery metrics to evaluate whether to provide services that use (i.e., are based on) the delivery prediction model. The predicted delivery metrics are generated by computer models and provide information that describes whether the delivery prediction model may accurately predict delivery times for orders. The predicted delivery metrics may include a predicted time for a shopper to accept an order and a predicted percentage of orders that will be late (delivered past a stated delivery time). The predicted delivery metrics in one or more embodiments may be generated for individual geographic regions (which may also be termed "zones") rather than for individual orders. The predicted delivery metrics may then be compared with one or more thresholds to selectively provide (or not provide) arrival prediction services based on the delivery prediction model. That is, when the predicted delivery metrics exceed the threshold (e.g., predicted time for a shopper to accept an order or the percentage of late orders is higher than the threshold), arrival prediction services based on predictions from the delivery prediction model may be suspended. For example, users may still be able to request orders, but may not receive additional services such as a predicted delivery time or a quality-of-service guarantee (e.g., a delivery by a certain time, which may be based on the predicted delivery time). In some embodiments, the arrival prediction service may be selectively provided (i.e., provided or not provided) for the entire geographic region (e.g., in embodiments in which the metrics are generated for geographic regions), or for an amount of time, or until the metrics fall below the respective predicted delivery metrics. As such, in one or more embodiments, the metrics are calculated for individual zones to enable or disable such services for amounts of time based on the metrics, such that the metrics may be calculated at an initial time and result in disabling the service for a zone in a first amount of time, after which the metrics may be recalculated and result in enabling the service for the zone in a second amount of time. In additional configurations, the online concierge system may offer several levels of service, e.g., for different types of users; the thresholds may be set for each level of service, such that the arrival prediction service may be separately enabled or disabled for each level of service.

The predicted delivery metrics thus provide a mechanism for evaluating the predictions of the delivery prediction model and suspending its use when conditions exist in which the outputs from the delivery prediction model may be inaccurate. In particular, the delivery prediction model may primarily use features that affect a delivery time for an individual order. When current conditions may significantly differ in ways that are unaccounted for or are incorrectly predicted, the delivery prediction model may be less effective and continue to encourage additional load with infeasible arrival promises—suspending services that use the delivery prediction model based on the predicted delivery metrics provides a way for identifying when the model may not perform effectively and thus avoiding downstream effects of ineffective or inaccurate model predictions.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Architecture

Figure 1:
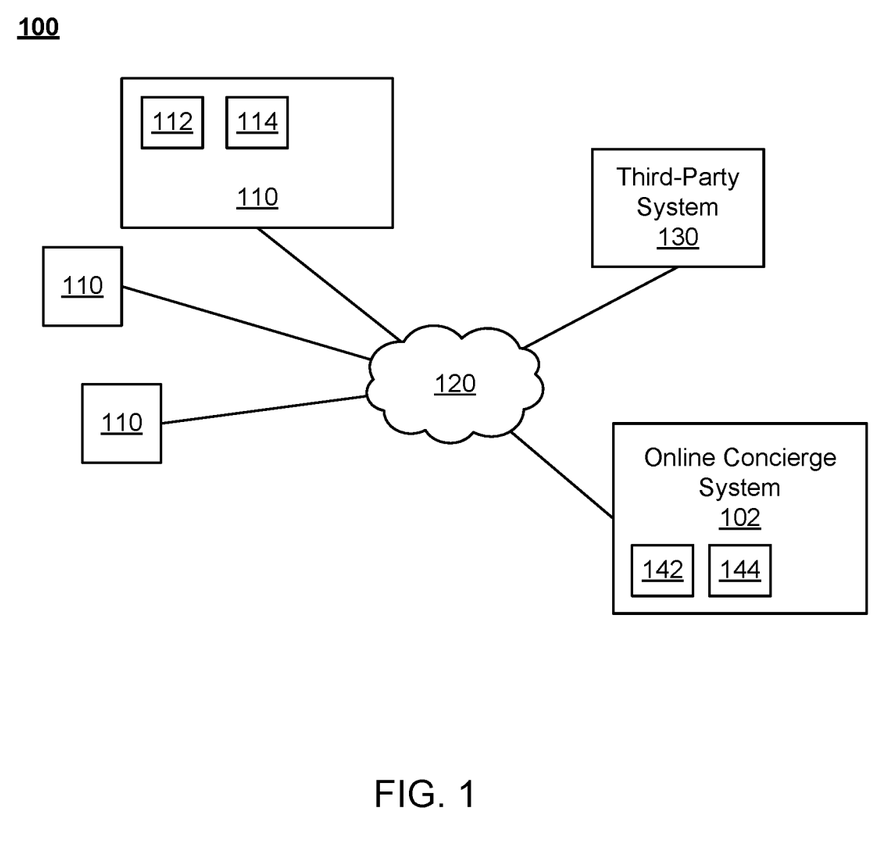
FIG. 1 is a block diagram of a system environment in which an online system operates, such as an online concierge system, according to one or more embodiments.

FIG. 1 is a block diagram of a system environment 100 in which an online system operates, such as an online concierge system 102, as further described below in conjunction with FIGS. 2 and 3, according to one or more embodiments. The system environment 100 shown by FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The online concierge system 102 may receive orders from users for delivery by a "shopper" who may retrieve items for the order from a physical location, such as a store or warehouse, and deliver the items to the user's designated location. The online concierge system 102 may provide estimated arrival services, e.g., to predict or guarantee a delivery time for the order. The estimated arrival time for an order may be generated by a delivery prediction model that receives various features or characteristics of the order to determine the likely arrival time, which the system may use to provide a guarantee to the user for order delivery. As such, for each incoming order request, the delivery prediction model may generate an estimated arrival time for the order that may be used for further services by the online concierge system 102. As discussed more fully below, the online concierge system 102 may determine predicted delivery metrics relating to expected order delivery and selectively offer arrival prediction services (i.e., services based on the delivery prediction model) based on the predicted delivery metrics. The predicted delivery metrics may indicate conditions in which the delivery prediction model may erroneously predict arrival times, such that the metrics may be used to throttle such services and thus prevent use of the model's output when the metrics indicate it may output results that may erroneously predict earlier arrival times than may actually be met. Stated another way, the metrics provide an approach for evaluating the effective accuracy and impact of the delivery prediction model and may suspend providing services based on the delivery prediction model when its output is predicted to err. Additional features of the environment 100 and the online concierge system 102 are further discussed below.

The client devices 110 are one or more computing devices capable of receiving user input as well as transmitting and/or receiving data via the network 120. In one or more embodiments, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one or more embodiments, a client device 110 executes an application allowing a user of the client device 110 to interact with the online concierge system 102. For example, the client device 110 executes a customer mobile application 206 or a shopper mobile application 212, as shown in FIG. 2 and is further described below in conjunction with FIGS. 4A and 4B, respectively, to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing functions. In various embodiments, a client device 110 includes a memory 114 comprising a non-transitory storage medium on which instructions are encoded. The memory 114 may have instructions encoded thereon that, when executed by the processor 112, cause the processor to perform functions to execute the customer mobile application 206 or the shopper mobile application 212 to provide the functions further described above in conjunction with FIGS. 4A and 4B, respectively.

The client devices 110 are configured to communicate via the network 120, which may comprise any combination of local area and/or wide area networks, using both wired and/or wireless communication systems. In one or more embodiments, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online concierge system 102 or with the one or more client devices 110. In one or more embodiments, a third-party system 130 is an application provider communicating information describing applications for execution by a client device 110, or communicating data to client devices 110 for use by an application executing on the client device. In other embodiments, a third-party system 130 provides content or other information for presentation via a client device 110. For example, the third-party system 130 stores one or more web pages and transmits the web pages to a client device 110 or to the online concierge system 102. The third-party system 130 may also communicate information to the online concierge system 102, such as advertisements, content, or information about an application provided by the third-party system 130.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further below that, when executed by the processor 142, cause the processor to perform the described functionality. For example, the memory 144 has instructions encoded thereon that, when executed by the processor 142, cause the processor 142 to determine attributes and attribute values for item categories. Additionally, the online concierge system 102 includes a communication interface configured to connect the online concierge system 102 to one or more networks, such as the network 120, or to otherwise communicate with devices (e.g., client devices 110) connected to the one or more networks.

One or more of a client device 110, a third-party system 130, or the online concierge system 102 may be special-purpose computing devices configured to perform specific functions as further described below, and may include specific computing components such as processors, memories, communication interfaces, and the like.

System Overview

Figure 2:
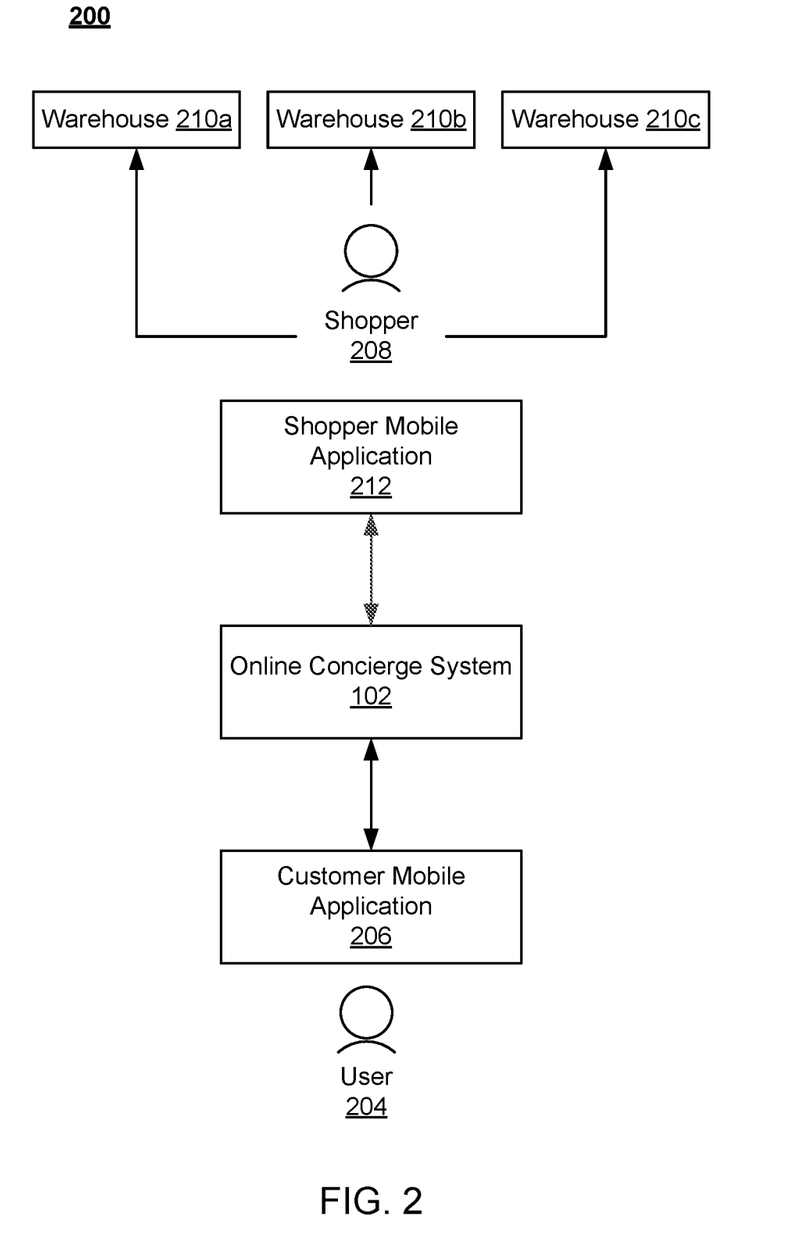
FIG. 2 illustrates an environment of an online platform, such as an online shopping concierge system, according to one or more embodiments.

FIG. 2 illustrates an environment 200 of an online platform, such as an online concierge system 102, according to one or more embodiments. The figures use like-reference numerals to identify like-elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

The environment 200 includes an online concierge system 102. The online concierge system 102 is configured to receive orders from one or more users 204 (only one is shown for the sake of simplicity). An order specifies a list of goods (items or products) to be delivered to the user 204. The order also specifies the location to which the goods are to be delivered and may also specify a preferred time window during which the goods should be delivered. In certain circumstances, the online concierge system 102 may provide an arrival prediction or arrival guarantee services for an order, such that the online concierge system 102 may guarantee a delivery by a particular time based on a predicted arrival time output by a computer model. In various embodiments, the online concierge system 102 may selectively provide (i.e., provide or not provide) these arrival services as further discussed below; in some embodiments, when the arrival services are not offered, the user 204 may still place an order, but without any predicted or guaranteed delivery time. In some embodiments, the order specifies one or more retailers from which the selected items should be purchased. The user may use a customer mobile application (CMA) 206 to place the order; the CMA 206 is configured to communicate with the online concierge system 102.

The online concierge system 102 is configured to transmit orders received from users 204 to one or more shoppers 208. A shopper 208 may be a contractor, employee, other person (or entity), robot, or other autonomous device enabled to fulfill orders received by the online concierge system 102. The shopper 208 travels between a warehouse and a delivery location (e.g., the user's home or office). A shopper 208 may travel by car, truck, bicycle, scooter, foot, or other mode of transportation. In some embodiments, the delivery may be partially or fully automated, e.g., using a self-driving car.

The environment 200 also includes three warehouses 210a, 210b, and 210c (only three are shown for the sake of simplicity; the environment could include hundreds of warehouses). The warehouses 210 may be physical retailers, such as grocery stores, discount stores, department stores, etc., or non-public warehouses storing items that can be collected and delivered to users 204. Each shopper 208 fulfills an order received from the online concierge system 102 at one or more warehouses 210, delivers the order to the user 204, or performs both fulfillment and delivery. In one or more embodiments, shoppers 208 make use of a shopper mobile application (SMA) 212, which is configured to interact with the online concierge system 102.

Figure 3:
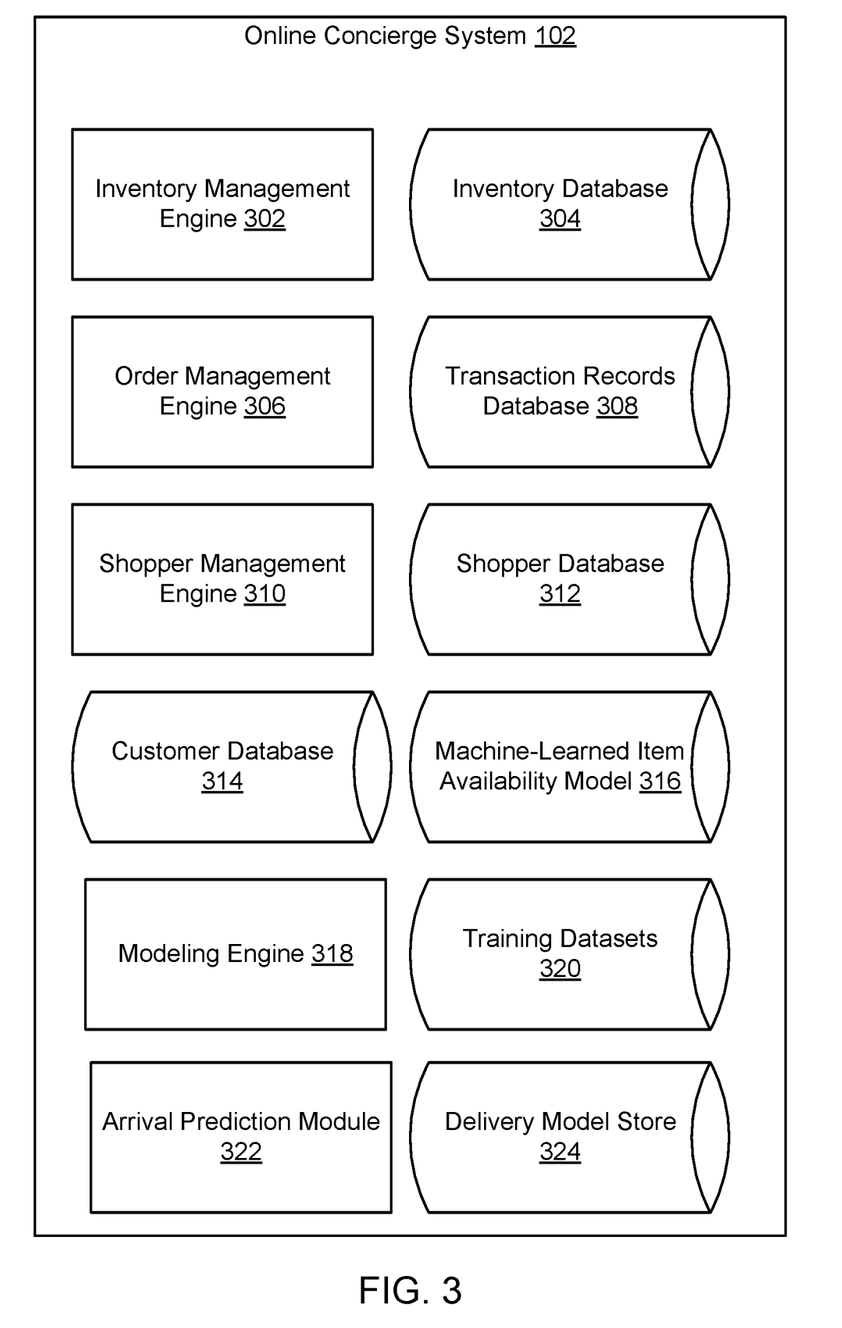
FIG. 3 is a diagram of an online shopping concierge system, according to one or more embodiments.

FIG. 3 is a diagram of an online concierge system 102, according to one or more embodiments. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes an inventory management engine 302, which interacts with inventory systems associated with each warehouse 210. In one or more embodiments, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and quantitative information about the items, including size, color, weight, stock keeping unit (SKU), serial number, and so on. In one or more embodiments, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse), the inventory database 304 may store a time that the item was last found, a time that the item was last not-found (a shopper looked for the item but could not find it), the rate at which the item is found, and the popularity of the item.

For each item, the inventory database 304 identifies one or more attributes of the item and any corresponding values (i.e., attribute values) for each attribute of an item. For example, the inventory database 304 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 304 to maintain values of different categories for various items. In various embodiments, the attributes may be provided by or may be based on information specified by a warehouse, item catalog, or other external source.

In additional embodiments, attributes to be used for characterizing items and/or the particular attribute values for an attribute of an item (e.g., a product) may be extracted, predicted, or inferred by a computer model of the online concierge system 102. In various embodiments, the attributes for an item may be based on a set of attributes and associated attribute values identified for items in an associated category. That is, each category of item (an item category) may have an associated set of attributes used to characterize items in that category. Each attribute for a category may have different values that may differ across different item categories. For example, the attribute "flavor" for the item category "Yogurt" may include items having attribute values of [non-flavored, strawberry, peach], while the "flavor" attribute for the item category "snack bar" may have items with attribute values of [granola, raisin, chocolate]. Attributes of various items may be identified by computer models that infer attributes based on information about an item.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 302 determines a taxonomy of items offered by the warehouse 210. Different levels in the taxonomy may provide different levels of specificity about the items included in the levels. In various embodiments, the taxonomy identifies a category and associates one or more specific items with a specific category. For example, a category identifies "milk," and the taxonomy associates identifiers of different milk items (e.g., milk offered by different brands, milk having one or more different attributes, etc.) with that category. Thus, the taxonomy maintains associations between a category and specific items offered by the warehouse 210 matching the identified category. In some embodiments, different levels in the taxonomy identifies items with differing levels of specificity based on any suitable attribute or combination of attributes of the items. For example, different levels of the taxonomy specify different combinations of attributes for items, so items in lower levels of the hierarchical taxonomy have a greater number of attributes corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., higher levels include a fewer number of items satisfying a more specific category). The taxonomy may be received from a warehouse 210 in various embodiments. In other embodiments, the inventory management engine 302 applies a trained classification module to an item catalog received from a warehouse 210 to include different items in the levels of the taxonomy, so application of the trained classification model associates specific items with categories corresponding to levels within the taxonomy.

The online concierge system 102 also includes an order management engine 306, which is configured to synthesize and display an ordering interface to each user 204 (for example, via the customer mobile application 206). The order management engine 306 is also configured to access the inventory database 304 to determine which products are available at which specific warehouse 210. The order management engine 306 may supplement the product availability information from the inventory database 304 with an item availability predicted by a machine-learned item availability model 316. The order management engine 306 determines a sale price for each item ordered by a user 204. Prices set by the order management engine 306 may or may not be identical to other prices determined by retailers (such as a price that users 204 and shoppers 208 may pay at the retail warehouses). The order management engine 306 also facilitates any transaction associated with each order.

The order management engine 306 may also provide an arrival prediction service with an estimated arrival time provided by an arrival prediction module 322 based on a predicted delivery time. As discussed further below, the arrival prediction module 322 may use one or more computer models to predict an arrival time for an order and whether to use the predicted arrival time for providing related arrival prediction services. The arrival prediction services may include services at different service levels that may refer to different priority levels or service guarantees, such as express, priority, or normal delivery speeds. As such, for orders requested under a normal delivery speed, when the arrival prediction services are available, the output of the delivery prediction model may be used to offer a delivery time in accordance with the predicted delivery time. In some circumstances, the predicted arrival time and related services may be deactivated for one level of service (e.g., normal) and maintained for other levels of service (e.g., priority or express). As such, the arrival prediction services for different levels may be selectively offered at different times.

In one or more embodiments, the order management engine 306 charges a payment instrument associated with a user 204 when he/she places an order. The order management engine 306 may transmit payment information to an external payment gateway or payment processor. The order management engine 306 stores payment and transactional information associated with each order in a transaction records database 308.

In various embodiments, the order management engine 306 generates and transmits a search interface to a client device 110 of a user 204 for display via the customer mobile application 206. The order management engine 306 receives a query comprising one or more terms from a user 204 and retrieves items satisfying the query, such as items having descriptive information matching at least a portion of the query made by the user 204. In various embodiments, the order management engine 306 uses item embeddings to retrieve specific items based on a received query. For example, the order management engine 306 generates an embedding for a query and determines the measures of similarity between the embedding for the query and item embeddings for various items included in the inventory database 304.

In addition, the order management engine 306 may use attributes, including predicted or inferred attributes, for scoring, filtering, or otherwise evaluating the relevance of items as responsive to the order query. As such, the attributes predicted (i.e., inferred) may be added to the inventory database 304 and used to improve various further uses and processing of the item information, of which an order query is one example. In general, the additional attributes of an item that may be predicted by the system may be used for a variety of purposes according to the particular embodiment, type of item, predicted attributes, etc.

To use attributes for an order query, attributes relevant to the order query may be determined from the order query. The attributes may be explicitly designated or may be inferred from the order or from the user placing the order. For example, an order query may provide a text search for "milk" and specify that results to the query should include only items with the attribute "dairy-free." In other examples, a particular user may be associated with dietary restrictions or other attribute preferences and indicate that the online concierge system 102 may automatically apply these preferences to queries or orders from that particular user.

In some embodiments, the order management engine 306 also shares order details with warehouses 210. For example, after successful fulfillment of an order, the order management engine 306 may transmit a summary of the order to the appropriate warehouses 210. The summary may indicate the items purchased, the total value of the items, and in some cases, an identity of a shopper 208 and a user 204 associated with the transaction. In one or more embodiments, the order management engine 306 pushes the transaction and/or order details asynchronously to associated retailer systems. This may be accomplished via use of webhooks, which enable programmatic or system-driven transmission of information between web applications. In another embodiment, retailer systems may be configured to periodically poll the order management engine 306, which provides details of all orders which have been processed since the last poll request.

The order management engine 306 may interact with a shopper management engine 310, which manages communication with and utilization of shoppers 208. In one or more embodiments, the shopper management engine 310 receives a new order from the order management engine 306. The shopper management engine 310 identifies the appropriate warehouse 210 to fulfill the order based on one or more parameters, such as a probability of item availability determined by a machine-learned item availability model 316, the contents of the order, the inventory of the warehouses, and the proximity to the delivery location. The shopper management engine 310 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 310 accesses a shopper database 312, which stores information describing each shopper 208, such as his/her name, gender, rating, previous shopping history, and so on.

As part of fulfilling an order, the order management engine 306 and/or shopper management engine 310 may access a customer database 314 which stores information describing each user (e.g., a customer). This information could include each user's name, address, gender, shopping preferences, favorite items, stored payment instruments, and so on.

In various embodiments, the order management engine 306 determines whether to delay display of a received order to shoppers 208 for fulfillment by a time interval. In response to determining to delay the received order by a time interval, the order management engine 306 evaluates orders received after the received order and during the time interval for inclusion in one or more batches that also includes the received order. After the time interval, the order management engine 306 displays the order to one or more shoppers 208 via the shopper mobile application 212; if the order management engine 306 generated one or more batches including the received order and one or more orders received after the received order and during the time interval, the one or more batches are also displayed to one or more shoppers via the shopper mobile application 212.

Machine Learning Models—Item Availability

The online concierge system 102 further includes a machine-learned item availability model 316, a modeling engine 318, and training datasets 320. The modeling engine 318 uses the training datasets 320 to generate one or more machine-learned models, such as the machine-learned item availability model 316. The machine-learned item availability model 316 can learn from the training datasets 320, rather than follow only explicitly programmed instructions. The inventory management engine 302, order management engine 306, and/or shopper management engine 310 can use the machine-learned item availability model 316 to determine a probability that an item is available at a warehouse 210. The machine-learned item availability model 316 may be used to predict item availability for items being displayed to a user, selected by a user, or included in received delivery orders. The machine-learned item availability model 316 may be used to predict the availability of any number of items.

The machine-learned item availability model 316 can be configured to receive, as inputs, information about an item, the warehouse for picking the item, and the time for picking the item. The machine-learned item availability model 316 may be adapted to receive any information that the modeling engine 318 identifies as indicators of item availability. At minimum, the machine-learned item availability model 316 receives information about an item-warehouse pair, such as an item in a delivery order and a warehouse at which the order could be fulfilled. Items stored in the inventory database 304 may be identified by item identifiers. As described above, various characteristics, some of which are specific to the warehouse (e.g., a time that the item was last found in the warehouse, a time that the item was last not found in the warehouse, the rate at which the item is found, and the popularity of the item), may be stored for each item in the inventory database 304. Similarly, each warehouse may be identified by a warehouse identifier and stored in a warehouse database along with information about that warehouse. A particular item at a particular warehouse may be identified using an item identifier and a warehouse identifier. In other embodiments, the item identifier refers to a particular item at a particular warehouse, so that the same item at two different warehouses is associated with two different identifiers unique to the two warehouses. For convenience, both of these options to identify an item at a warehouse are referred to herein as an "item-warehouse pair." Based on the identifier(s), the online concierge system 102 can extract information about the item and/or warehouse from the inventory database 304 and/or warehouse database and provide this extracted information as inputs to the machine-learned item availability model 316.

The machine-learned item availability model 316 contains a set of functions generated by the modeling engine 318 from the training datasets 320 that relate the item, warehouse, timing information, and/or any other relevant inputs, to the probability that a particular item is available at a particular warehouse. Thus, for a given item-warehouse pair, the machine-learned item availability model 316 outputs a probability that the item is available at the warehouse. The machine-learned item availability model 316 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 316 includes a confidence score. The confidence score may be an error or uncertainty score of the output availability probability and may be calculated using any standard statistical error measurement. In some examples, the confidence score is based, in part, on whether the item-warehouse pair availability prediction was accurate for previous delivery orders (e.g., if the item was predicted to be available at the warehouse and was not found by the shopper or predicted to be unavailable but found by the shopper). In some examples, the confidence score is based, in part, on the age of the data for the item, e.g., if availability information has been received within the past hour or the past day. The set of functions of the machine-learned item availability model 316 may be updated and adapted following retraining with new training datasets 320. The machine-learned item availability model 316 may be any machine-learning model, such as a neural network, boosted tree, gradient boosted tree, or random forest model. In some examples, the machine-learned item availability model 316 is generated from XGBoost algorithm.

The item probability generated by the machine-learned item availability model 316 may be used to determine instructions delivered to the user 204 and/or shopper 208, as described in further detail below.

The training datasets 320 includes training data from which the machine-learned models may learn parameters, such as weights, model structure, and other aspects for developing predictions. For the machine-learned item availability model 316, the training datasets 320 may relate a variety of different factors to known item availabilities from the outcomes of previous delivery orders (e.g., if an item was previously found or previously unavailable). The training datasets 320 includes the items included in previous delivery orders, whether the items in previous delivery orders were picked, the warehouses associated with the previous delivery orders, and a variety of characteristics associated with each of the items (which may be obtained from the inventory database 304). Each piece of data in the training datasets 320 includes the outcome of a previous delivery order (e.g., if the item was picked or not). The item characteristics may be determined by the machine-learned item availability model 316 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 316 may weigh these factors differently, where the weights are a result of a "learning" or training process on the training datasets 320. The training datasets 320 are very large datasets taken across a wide cross-section of warehouses, shoppers, items, delivery orders, times, and item characteristics. The training datasets 320 are large enough to provide a mapping from an item in an order to a probability that the item is available at a warehouse. In addition to previous delivery orders, the training datasets 320 may be supplemented by inventory information provided by the inventory management engine 302. In some examples, the training datasets 320 are historic delivery order information used to train the machine-learned item availability model 316, whereas the inventory information stored in the inventory database 304 include factors input into the machine-learned item availability model 316 to determine an item availability for an item in a newly received delivery order. In some examples, the modeling engine 318 may evaluate the training datasets 320 to compare a single item's availability across multiple warehouses to determine if an item is chronically unavailable. This may indicate that an item is no longer manufactured. The modeling engine 318 may query a warehouse 210 through the inventory management engine 302 for updated item information on these identified items.

The training datasets 320 include a time associated with previous delivery orders. In some embodiments, the training datasets 320 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 320 include a day of the week previous delivery orders were placed. The day of the week may impact item availability since popular shopping days may have reduced inventory of particular items, or restocking shipments may be received on particular days. In some embodiments, training datasets 320 include a time interval since an item was previously picked in a previously delivered order. If a particular item has recently been picked at a warehouse, this may increase the probability that it is still available. If there has been a long time interval since a particular item has been picked, this may indicate that the probability of that item being available for subsequent orders is low or uncertain. In some embodiments, training datasets 320 include a time interval since an item was not found in a previous delivery order. If there has been a short time interval since an item was not found, this may indicate that there is a low probability that the item is available in subsequent delivery orders. And conversely, if there has been a long time interval since an item was not found, this may indicate that the item may have been restocked and is available for subsequent delivery orders. In some examples, training datasets 320 may also include a rate at which an item is typically found by a shopper at a warehouse, a number of days since inventory information about the item was last received from the inventory management engine 302, a number of times an item was not found in a previous week, or any number of additional rate or time information. The relationships between the time information and item availability are determined by the modeling engine 318 training a machine-learning model with the training datasets 320, producing the machine-learned item availability model 316.

The training datasets 320 includes item characteristics. In some examples, the item characteristics include a department associated with the item. For example, if the item is yogurt, it is associated with the dairy department. A department may be categorized as the bakery, beverage, nonfood and pharmacy, produce and floral, deli, prepared foods, meat, seafood, dairy, or any other categorization of items used by the warehouse. The department associated with an item may affect item availability, since different departments have different item turnover rates and inventory levels. In some examples, an item's characteristics include an aisle of the warehouse associated with the item. The aisle of the warehouse may affect item availability since different aisles of a warehouse may be more frequently re-stocked than others. Additionally, or alternatively, the item characteristics include an item popularity score. The item popularity score for an item may be proportional to the number of delivery orders received that included that particular item. An alternative or additional item popularity score may be provided by a retailer through the inventory management engine 302.

In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger or smaller inventories in the warehouses. In some examples, the item characteristics may include a number of times a shopper was instructed to keep looking for an item after he or she was initially unable to find the item, a total number of delivery orders received for the item, whether or not the product is organic, vegan, gluten free, or any other characteristics associated with an item. The relationships between item characteristics and item availability are determined by the modeling engine 318 training a machine-learning model with the training datasets 320, producing the machine-learned item availability model 316.

The training datasets 320 may include additional item characteristics that affect item availability and can therefore be used to build the machine-learned item availability model 316 relating the delivery order for an item to its predicted availability. The training datasets 320 may be periodically updated with recent previous delivery orders. The training datasets 320 may be updated with item availability information provided directly from shoppers 208. Following updating of the training datasets 320, a modeling engine 318 may retrain a model with the updated training datasets 320 and produce a new machine-learned item availability model 316.

Arrival Prediction Services

The online concierge system 102 includes an arrival prediction module 322 that may provide arrival prediction services, e.g., to the order management engine 306. The arrival prediction services may be used to predict an estimated arrival time for an order to a user's destination. The arrival prediction module 322 may use one or more trained models stored in the delivery model store 324 to predict an arrival time and whether to provide arrival prediction services for an order. In one or more embodiments, the arrival prediction module 322 applies models to generate predicted delivery metrics that predict the likely success of the arrival time prediction generated by a trained delivery prediction model. These various models may be stored in the delivery model store 324. That is, the delivery prediction model, which may predict the arrival time for an order, may be selectively used or not used (along with its associated services) based on the predicted delivery metrics predicted by other models. In this way, the predicted delivery metrics may provide an assessment of the likely reliability of the predictions from the delivery prediction model.

When the delivery prediction services are active, for each incoming order request, the arrival prediction service estimates the total time by when a customer will receive an order. As such, the delivery prediction model and its related services may also be described as an estimated time to arrival (ETA) model/services. The predicted arrival time model may receive information about an order, such as basket size, total value, warehouse, location, distance, estimated travel time, etc., to predict the time from order placement to order delivery. In various embodiments, the predicted arrival time model may have various model architectures and predict the arrival time as a variable (e.g., as a float or integer) or a range of arrival times that may be characterized as a class (e.g., predicting "classes" of 0-15 minutes, 15-30 minutes, 30-45 minutes, . . . , >6 h, etc.) The delivery prediction model may be trained on a data set of previous orders and related features and characteristics of the orders.

The metrics used for determining whether to selectively provide the delivery prediction services may be generated by one or more additional computer models, which may also be stored in the delivery model store 324. Because the delivery prediction model is trained to predict a future arrival time for an individual order, the delivery prediction model may ineffectively account for current circumstances that may affect delivery time, particularly circumstances that may affect many orders at once. Stated another way, such circumstances may cause the conditions in which current orders are to be processed to deviate from the circumstances of orders that were used to train the delivery prediction model. As one example, the lateness of the order that a user receives may reflect errors in the delivery prediction model. This metric may measure whether an order (or a percentage of orders) was delivered after the promised arrival time (e.g., within a threshold of the promised arrival time). However, the lateness of an order is often impacted by delivery-zone level dynamics rather than individual order level information and may thus not be effectively predicted by the order-based delivery prediction model. For example, this may be caused by an insufficient supply of shoppers or inclement weather conditions in the zone. These may impact the predicted arrival time for many orders and may cause them to differ from the predicted time by the delivery prediction model.

As such, the delivery prediction metrics may be used to selectively provide the delivery prediction model (and its related services) to account for such real-time circumstances. These may be used to effectively throttle the delivery prediction model and related services to reduce over-promising resulting from arrival predictions that the model may not effectively represent in its features. Further details regarding such models and the use of them for selectively providing the delivery prediction services are further discussed with respect to FIGS. 5 and 6.

Customer Mobile Application

Figure 4A:
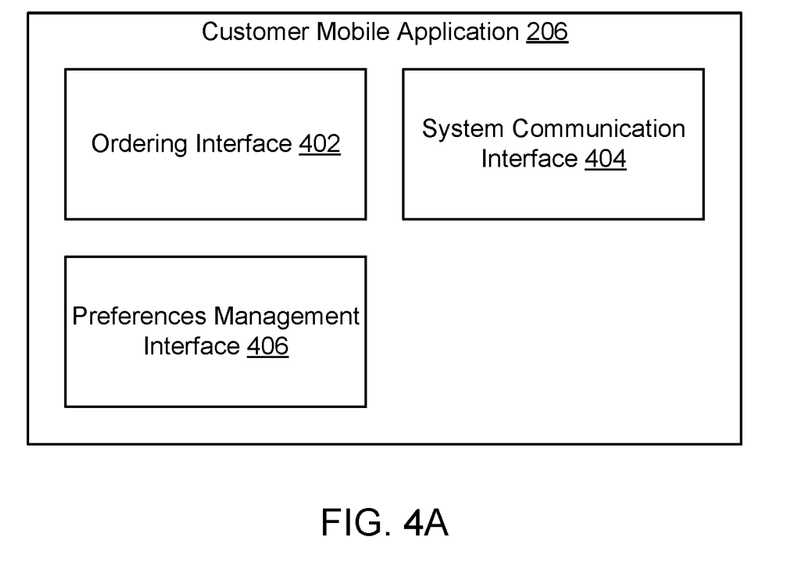
FIG. 4A is a diagram of a customer mobile application (CMA), according to one or more embodiments.

FIG. 4A is a diagram of the customer mobile application (CMA) 206, according to one or more embodiments. The CMA 206 includes an ordering interface 402, which provides an interactive interface with which the user 204 can browse through and select items/products and place an order. The CMA 206 also includes a system communication interface 404 which, among other functions, receives inventory information from the online concierge system 102 and transmits order information to the online concierge system 102. The CMA 206 also includes a preferences management interface 406, which allows the user 204 to manage basic information associated with his/her account, such as his/her home address and payment instruments. The preferences management interface 406 may also allow the user 204 to manage other details such as his/her favorite or preferred warehouses 210, preferred delivery times, special instructions for delivery, and so on.

Shopper Mobile Application

Figure 4B:
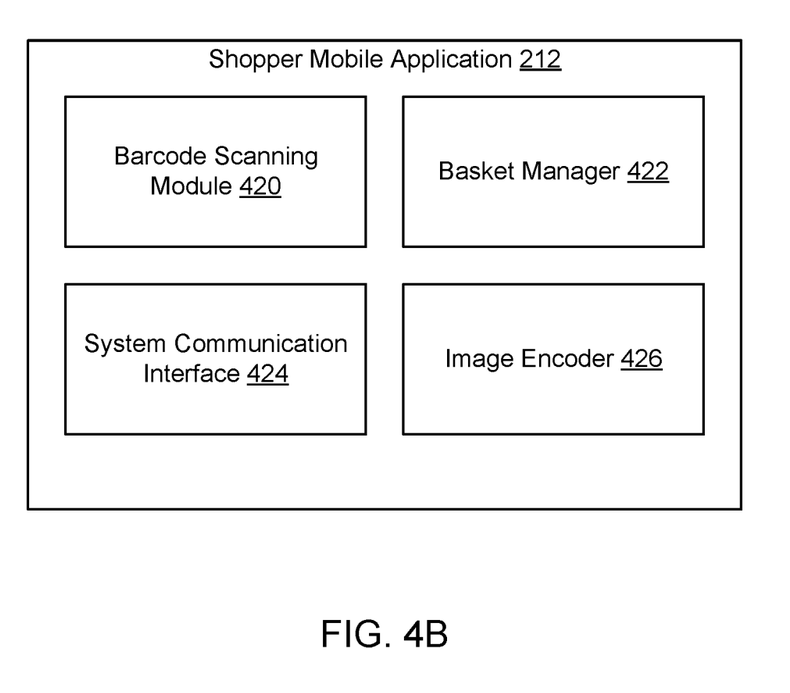
FIG. 4B is a diagram of a shopper mobile application (SMA), according to one or more embodiments.

FIG. 4B is a diagram of the shopper mobile application (SMA) 212, according to one or more embodiments. The SMA 212 includes a barcode scanning module 420 which allows a shopper 208 to scan an item at a warehouse 210 (such as a can of soup on the shelf at a grocery store). The barcode scanning module 420 may also include an interface which allows the shopper 208 to manually enter information describing an item (such as its serial number, SKU, quantity and/or weight) if a barcode is not available to be scanned.

SMA 212 also includes a basket manager 422, which maintains a running record of items collected by the shopper 208 for purchase at a warehouse 210. This running record of items is commonly known as a "basket." In one or more embodiments, the barcode scanning module 420 transmits information describing each item (such as its cost, quantity, weight, etc.) to the basket manager 422, which updates its basket accordingly. The SMA 212 also includes a system communication interface 424, which interacts with the online concierge system 102. For example, the system communication interface 424 receives an order from the online concierge system 102 and transmits the contents of a basket of items to the online concierge system 102. The SMA 212 also includes an image encoder 426, which encodes the contents of a basket into an image. For example, the image encoder 426 may encode a basket of goods (with an identification of each item) into a quick response (QR) code, which can then be scanned by an employee of the warehouse 210 at check-out.

Figure 5:
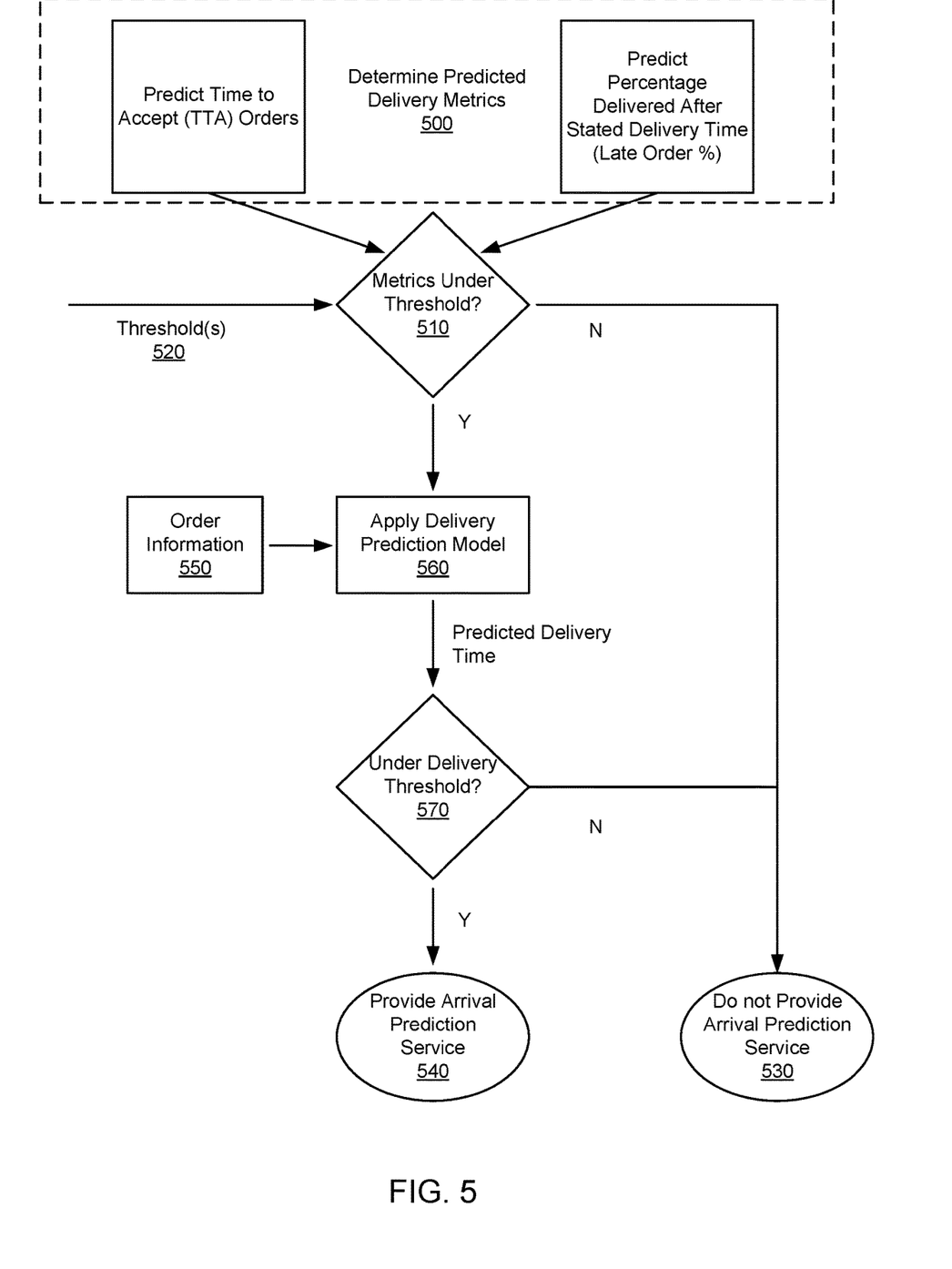
FIG. 5 provides an example flow for selectively providing predicted delivery services based on a delivery prediction model, according to one or more embodiments.

FIG. 5 provides an example flow for selectively providing predicted delivery services based on a delivery prediction model 560, according to one or more embodiments. The flow shown in FIG. 5 may be performed by a portion of a system that controls whether to provide arrival prediction services 540, and in one or more embodiments, is performed by the arrival prediction module 322. This process may be used to determine whether to use the predicted arrival time for an order as determined by a trained delivery prediction model 560 and provide related services based on the predicted arrival time.

To determine whether to provide the related services, one or more predicted delivery metrics 500 are determined by one or more computer models. The predicted delivery metrics 500 generally describe expected characteristics of the delivery of orders and the expected performance of orders entered for delivery that may reflect erroneous predictions made by the delivery prediction model. In this example, one or more computer models may predict an expected amount of time for a shopper to accept an order. This may also be termed a time-to-accept (TTA). The TTA reflects the expected delay after orders are available for shoppers to select and accept for delivery. In addition, the predicted delivery metrics of this example includes a model that predicts 500 the percentage of orders expected to be delivered after the stated delivery time, i.e., the percentage of late orders (late order %). In this example, both TTA and late order % may both be used, optionally in addition to other metrics, in determining whether to provide the arrival prediction service 540. In other embodiments, TTA or late order % may be used without the other and different types of additional predicted delivery metrics may also be used. In general, the predicted delivery metrics may be used to indicate that the predicted arrival times from the delivery prediction model may not reliably reflect the expected delivery time. That is, the predicted delivery metrics indicate current delivery conditions may deviate significantly, such that the expected arrival times predicted by the model likely do not accurately reflect the current conditions, indicating that the model is likely to err or fail to accurately capture aspects of the current environment in the arrival predictions it outputs. In some embodiments, these arrival prediction metrics may also be used to describe geographical region-related (i.e., zone-related) characteristics that may affect more than a single order, instead reflecting conditions that may affect many orders in the geographic region.

The predicted delivery metrics may be determined by any suitable computer models according to the particular metrics used in various embodiments. While TTA and late order % are metrics shown here, additional metrics and related models may be used in various embodiments. In addition, each metric may be calculated for respective geographic regions and in some cases may be based on respective computer models trained for each region that may thus learn the respective characteristics for that region.

In one or more embodiments, the computer model that predicts time-to-accept may output a predicted time to accept (e.g., for a particular order or as an average across several orders in a region or zone), which may predict a time to accept for an order based on the number of available shoppers, number of orders, grouping of orders into consolidated trips for a shopper, a ratio of shoppers to grouped orders, locations associated with the order(s), when orders were received, and so forth. One example embodiment for a time-to-accept model is provided as a selection prediction model in U.S. patent application Ser. No. 17/493,780, filed Oct. 4, 2021, which is hereby incorporated by reference in its entirety. When the expected TTA for orders increases, it may suggest that there are additional factors in the order-delivery environment that may impact accuracy of predictions from the delivery prediction model.

Similarly, the model to predict the late order % may be trained to predict a portion (or percentage) of orders outstanding that may be delivered beyond the predicted arrival time. In some embodiments, the late order % is based on recent historical orders (e.g., the recently delivered orders that were delivered beyond the respective delivery time for the order). In further embodiments, the late order % may also be a prediction based on orders that have been placed and are not yet delivered. In this example, the set of placed orders that have a stated delivery time may be evaluated to determine whether the orders are likely to be delivered by the delivery time. The computer model for predicting late order arrival may vary in different embodiments, similar to the order prediction model discussed above. In some embodiments, a predicted time of arrival may be determined for each order, which may be compared with the stated delivery time to determine whether the predicted arrival time is later than the stated delivery time by a threshold 520 amount, in which case it may be expected to be delivered late. In other embodiments, an order may be evaluated by a model generates a "lateness" as a classification based on characteristics of the order, such as whether the order has been retrieved by a shopper, the distance remaining in the delivery (or predicted travel time along a route to the destination of delivery), the amount of time remaining before the stated delivery time, and other suitable factors. In some circumstances, the supply of shoppers (e.g., the number of shoppers available to fulfill orders) and the number of outstanding orders may also be used to features in the predictive model. As such, the outstanding orders may be considered on an individual basis and/or as a group to determine the predicted percentage that are likely to be delivered late. As with the TTA prediction, increases in the predicted late order % may reflect that existing conditions may cause the current delivery prediction model 560 to err (e.g., in part because additional incoming orders, if optimistic about delivery time, may further increase the number of orders pending for delivery with an infeasible predicted delivery time).

The predicted delivery metrics may then be compared to determine whether they are under one or more thresholds 510 for providing the arrival prediction service. In general, the metrics discussed herein increase when the expected quality of the order delivery service (and the predicted arrival times by the delivery prediction model) decreases, such that being "under" the threshold indicates that the model performs well. Other metrics may increase when the delivery prediction model is performing well, in which case being "over" the threshold may indicate the service should be provided. For convenience, "under" the threshold as used herein may reflect relatively higher expected performance by the predictive model and "over" the threshold may reflect relatively lower expected performance by the predictive model. As such, while in practice, metrics that correlate positively with the expected performance of the predictive model may be considered to indicate using the model when these metrics exceed a threshold (e.g., on-time orders >95%), for the purpose of this discussion, such comparison may be considered to be "under" the threshold. Equivalently, such metrics (that positively correlate with model predictions) may be inverted and considered to be under the relevant threshold.

The one or more thresholds 520 may correspond to each of the predicted delivery metrics 500, such that each metric may be compared with a corresponding threshold 520. The metrics as a whole may be determined to be under the threshold 510 when any or all of the metrics are under the threshold 510. In other embodiments, the metrics may be compared with the threshold(s) 520 as a weighted combination of the metrics, e.g., to determine an overall score based on the predicted delivery metrics 500. These and other approaches may be used for determining the exact methodology for evaluating whether the metrics indicate that the arrival prediction services should be provided.

The threshold(s) 520 may also differ for different times of day, different orders, different geographical regions, and for different levels of service. As such, for a particular combination of these, the relevant thresholds 520 may be obtained and evaluated for the predicted delivery metrics. For example, the online concierge system 102 may provide different levels of service, for example having different priority levels or speeds of service. As such, in some embodiments, the predicted delivery metrics 500 for one level of service may differ from the predicted delivery metrics 500 for another level of service, and similarly, the applicable threshold(s) 520 may also differ for different levels of service. As such, one level of service may be over the threshold 520, such that the arrival prediction service is not provided 530, while another level of service may have metrics under the related threshold 510, such that the other level of service is provided 540. As such, one level of service, such as expedited or priority service, may be provided with the arrival prediction service, while another level of service, such as regular service, may be provided without the arrival prediction service as the predicted delivery metrics 500, thresholds 520, or comparison thereof may differ for the different levels of service.

The thresholds 520 for comparing the respective predicted delivery metrics 500 may be set manually (e.g., by an operator of the online concierge system 102) or may be automatically determined based on historical order delivery records. For example, the thresholds may be automatically determined based on previous deliveries and the relationship of predicted delivery metrics and whether orders were delivered beyond the predicted arrival time of the delivery prediction model. That is, for historical orders, the relative lateness of actual order delivery (e.g., order delivery time relative to predicted arrival time from the model) may be associated with the predicted delivery metrics 500 at the time the order was entered. The difference between the predicted delivery metrics 500 for late orders (e.g., orders that were delivered more than a threshold number of minutes late) and on-time orders may be used to automatically set the relevant threshold(s) 520. Similarly, the orders may also be grouped or clustered to identify when a significant number of orders were late within a given time period (i.e., which may identify when overall conditions caused the delivery prediction model to err in its predictions, rather than individual orders in isolation). The thresholds may be set, for example, by applying a regression (e.g., a linear regression or more complex regression function that may operate as the threshold) of the predicted delivery metrics 500. As another example, the thresholds 520 may be set by A/B testing different values of the thresholds to determine how different thresholds or metrics affect the delivery prediction service.

In some embodiments, rather than determine predicted delivery metrics 500 and apply the relevant thresholds 520 when each order is received, the arrival prediction services may be selectively provided 540 and not provided 530 for individual time periods, such that all relevant orders within the time period may be provided 540 or not provided 530 an arrival prediction service. For example, the delivery metrics may be calculated every five minutes to enable or disable the arrival prediction service for the following five minutes. As such, the metrics may be calculated for a first amount of time and determine that no arrival prediction services 530 should be provided during the first amount of time, and when the first amount of time ends, the metrics may be re-calculated for a second amount of time and determine that the arrival prediction services 540 should be provided. This approach may reduce computing resources for providing or not providing the arrival prediction service while enabling dynamic and near real-time responsiveness to changing conditions.

In some embodiments, as discussed above, the arrival prediction service may be enabled 540 or disabled 530 for different geographical regions or levels of service independently. As such, in some embodiments, the predicted delivery metrics 500 may be determined and the arrival prediction services selectively provided for each geographical region and each level of service independently for each time period.

In some embodiments, when the metrics are below the threshold, an additional delivery threshold may be applied to verify that the predicted delivery time for a particular order is within a range that may be provided to a user. For example, while the metrics may indicate that the model may be providing effective predictions, the predicted delivery time itself may be beyond the range of times that are offered. As such, order information 550 may be applied 560 by the delivery prediction model 560 to determine the order-specific predicted delivery time. The predicted delivery time may be compared to a delivery threshold and when the predicted delivery time is not under the relevant threshold, the arrival prediction service is not provided 530. For example, the online concierge system may set the delivery threshold 570 for a particular level of service at a maximum of six hours by setting the delivery threshold at six hours. If the predicted delivery time is seven hours based on the order information 550, the arrival prediction service 530 may not be provided. When the predicted delivery time is within the delivery threshold, the arrival prediction service 540 is provided in this embodiment. As such, in some embodiments, the arrival prediction service may be for individual geographic regions and/or levels of service may be throttled according to the predicted delivery metrics 500, while retaining order-specific throttling of orders expected to exceed a delivery threshold 570. As the predicted delivery time is a function of the order information 550, in some embodiments, the user may be notified that the arrival prediction service is not provided 530 due to the high predicted delivery time, which may enable the user to adjust the order to reduce the predicted delivery time. For example, the user may remove items from the order or modify the delivery location.

Figure 6:
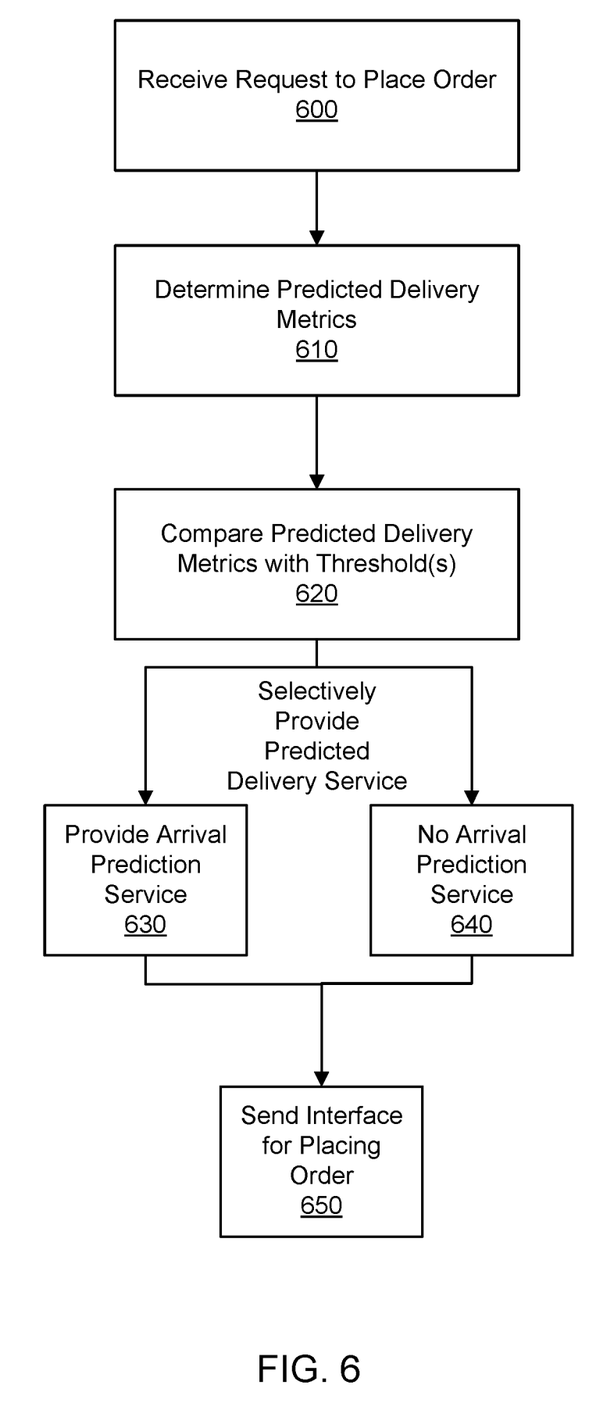
FIG. 6 provides another example flow for selectively providing predicted delivery services, according to one or more embodiments.

FIG. 6 provides another example flow for selectively providing predicted delivery services, according to one or more embodiments. The example of FIG. 6 may also be performed, for example, by components of the online concierge system 102, such as the order management engine 306 and the arrival prediction module 322. The user may navigate various interfaces of the online concierge system 102 (e.g., via a web page or an application on the user's device) to provide an order that is received 600 that may be eligible for arrival prediction services, if available. The online concierge system 102 may determine 610 the predicted delivery metrics that may be used for selectively providing 630 the arrival prediction service. While shown here as determining 610 the predicted delivery metrics after receiving 600 the request to place an order, in other embodiments, the predicted delivery metrics and determination 610 of whether to provide the arrival prediction service may be performed asynchronously, such as in embodiments in which the arrival prediction service is selectively provided 630 or not provided 640 for all orders within an amount of time (e.g., for a given geographical region or level of service). The relevant thresholds are retrieved and compared 620 with the predicted delivery metrics to selectively provide 630 or not provide 640 the prediction service. Based on whether the prediction service is to be provided, the user may be sent an interface 650 for the order indicating the availability of the arrival prediction services. For example, when the arrival prediction service is available, the predicted delivery time of the order may be displayed to the user. When the arrival prediction service is not available, the system may indicate that the services are not available or may indicate the particular metrics that caused the service to be unavailable or otherwise explain the time-limited unavailability of the service.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one or more embodiments, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for selectively providing an arrival prediction service, the method comprising:
   training a delivery prediction model to generate one or more predicted delivery metrics based on a plurality of training examples, wherein the delivery prediction model comprises a neural network and wherein training the delivery prediction model based on a training example of the plurality of training examples comprises:
   accessing a training example of the plurality of training examples, wherein the training example comprises a set of input features for the delivery prediction model, wherein the set of input features comprise order data describing an order placed in the past by a user, and wherein the training example further comprises a label for each of one or more delivery metrics, wherein the one or more delivery metrics include:
   a predicted time to accept orders by one of a plurality of shoppers; or
   a predicted percentage of orders delivered after a stated delivery time;
   applying the delivery prediction model to the set of input features to generate one or more predictions for the one or more delivery metrics;
   comparing each of the one or more predictions to the corresponding label of the training example; and
   updating a set of parameters of the neural network of the delivery prediction model based on the comparison of the one or more predictions to the corresponding labels of the training example;
receiving, through a graphical user interface of a client application operating on a client device associated with a user, a request to place an order by the user for fulfillment by a shopper;
applying the trained delivery prediction model to order data associated with the request to determine one or more predicted delivery metrics;
comparing the one or more predicted delivery metrics with one or more thresholds;
determining to provide the arrival prediction service for the request based on whether the one or more predicted delivery metrics meet the one or more thresholds; and
responsive to determining to provide the arrival prediction service based on the one or more predicted delivery metrics meet the one or more thresholds, providing the arrival prediction service for the request, wherein the arrival prediction service guarantees delivery of the order within a time window, wherein providing the arrival prediction service comprises:
transmitting instructions to the client device associated with the user to update the graphical user interface of the client application to include a user interface element describing the time window, wherein the instructions further cause the client device to display the updated graphical user interface through a display of the client device.

2. The method of claim 1, wherein the predicted delivery metrics are determined for a geographical region, and wherein the arrival prediction service is provided for requested orders within the geographical region.

3. The method of claim 1, further comprising:
determining a predicted delivery time for the order by the trained delivery prediction model; and
wherein the arrival prediction service is further provided based on the predicted delivery time.

4. The method of claim 3, wherein the arrival prediction service is not provided when the predicted delivery time is over a delivery threshold.

5. The method of claim 1, wherein the arrival prediction service is provided or not provided for a first time period, and the delivery metrics are determined again after a predetermined amount of time to provide the arrival prediction service in a second time period.

6. The method of claim 1, wherein comparing the one or more predicted delivery metrics with one or more thresholds comprises comparing each of the one or more predicted delivery metrics with a respective threshold of the one or more thresholds.

7. The method of claim 1, wherein two or more predicted delivery metrics are combined for comparison with a threshold of the one or more thresholds.

8. The method of claim 1, wherein a threshold of the one or more thresholds is automatically determined based on a data set of previous orders and predicted delivery times and associated predicted delivery metrics.

9. The method of claim 1, wherein the order may be fulfilled at a level of service or one of a plurality of levels of service; and wherein the arrival prediction service is not provided at one level of service and provided at another level of service based on the comparing.

10. The method of claim 1, further comprising:
responsive to determining to not provide the arrival prediction service based on the one or more predicted delivery metrics failing to meet the one or more thresholds, making the arrival prediction service unavailable and providing an interface for the user to place an order without the arrival prediction service.

11. The method of claim 1, further comprising:
receiving another order from a user from a user interface of the arrival prediction service; and
triggering a new order for fulfillment based on the receiving.

12. A non-transitory computer readable storage medium having instructions encoded thereon that, when executed by a processor, cause the processor to:
train a delivery prediction model to generate one or more predicted delivery metrics based on a plurality of training examples, wherein the delivery prediction model comprises a neural network and wherein training the delivery prediction model based on a training example of the plurality of training examples comprises:
accessing a training example of the plurality of training examples, wherein the training example comprises a set of input features for the delivery prediction model, wherein the set of input features comprise order data describing an order placed in the past by a user, and wherein the training example further comprises a label for each of one or more delivery metrics, wherein the one or more delivery metrics include:
a predicted time to accept orders by one of a plurality of shoppers; or a predicted percentage of orders delivered after a stated delivery time;
applying the delivery prediction model to the set of input features to generate one or more predictions for the one or more delivery metrics;
comparing each of the one or more predictions to the corresponding label of the training example; and
updating a set of parameters of the neural network of the delivery prediction model based on the comparison of the one or more predictions to the corresponding labels of the training example;
receive, through a graphical user interface of a client application operating on a client device associated with a user, a request to place an order by the user for fulfillment by a shopper;
apply the trained delivery prediction model to order data associated with the request to determine one or more predicted delivery metrics;
compare the one or more predicted delivery metrics with one or more thresholds;
determine to provide the arrival prediction service for the request based on whether the one or more predicted delivery metrics meet the one or more thresholds; and
responsive to determining to provide the arrival prediction service based on the one or more predicted delivery metrics meet the one or more thresholds, provide the arrival prediction service for the request, wherein the arrival prediction service guarantees delivery of the order within a time window, wherein providing the arrival prediction service comprises:
transmitting instructions to the client device associated with the user to update the graphical user interface of the client application to include a user interface element describing the time window, wherein the instructions further cause the client device to display the updated graphical user interface through a display of the client device.

13. The non-transitory computer readable storage medium of claim 12, wherein the predicted delivery metrics are determined for a geographical region, and wherein the arrival prediction service is provided for requested orders within the geographical region.

14. The non-transitory computer readable storage medium of claim 12, further comprising:
  determining a predicted delivery time for the order by the trained delivery prediction model; and
  wherein the arrival prediction service is further provided based on the predicted delivery time.

15. The non-transitory computer readable storage medium of claim 14, wherein the arrival prediction service is not provided when the predicted delivery time is over a delivery threshold.

16. The non-transitory computer readable storage medium of claim 12, wherein the arrival prediction service is provided or not provided for a first time period and the delivery metrics are determined again after a predetermined amount of time to provide the arrival prediction service in a second time period.

17. The non-transitory computer readable storage medium of claim 12, wherein comparing the one or more predicted delivery metrics with one or more thresholds comprises comparing each of the one or more predicted delivery metrics with a respective threshold of the one or more thresholds.

18. The non-transitory computer readable storage medium of claim 12, wherein two or more predicted delivery metrics are combined for comparison with a threshold of the one or more thresholds.

19. The non-transitory computer readable storage medium of claim 12, wherein a threshold of the one or more thresholds is automatically determined based on a data set of previous orders and predicted delivery times and associated predicted delivery metrics.

20. A system for selectively providing an arrival prediction service, the system comprising:
  a processor; and
  a non-transitory computer readable storage medium having instructions encoded thereon that, when executed by the processor, cause the processor to:
    train a delivery prediction model to generate one or more predicted delivery metrics based on a plurality of training examples, wherein the delivery prediction model comprises a neural network and wherein training the delivery prediction model based on a training example of the plurality of training examples comprises:
      accessing a training example of the plurality of training examples, wherein the training example comprises a set of input features for the delivery prediction model, wherein the set of input features comprise order data describing an order placed in the past by a user, and wherein the training example further comprises a label for each of one or more delivery metrics, wherein the one or more delivery metrics include:
        a predicted time to accept orders by one of a plurality of shoppers; or
        a predicted percentage of orders delivered after a stated delivery time;
      applying the delivery prediction model to the set of input features to generate one or more predictions for the one or more delivery metrics;
      comparing each of the one or more predictions to the corresponding label of the training example; and
      updating a set of parameters of the neural network of the delivery prediction model based on the comparison of the one or more predictions to the corresponding labels of the training example;
    receive, through a graphical user interface of a client application operating on a client device associated with a user, a request to place an order by the user for fulfillment by a shopper;
    apply the trained delivery prediction model to order data associated with the request to determine one or more predicted delivery metrics;
    compare the one or more predicted delivery metrics with one or more thresholds;
    determine to provide the arrival prediction service for the request based on whether the one or more predicted delivery metrics meet the one or more thresholds; and
    responsive to determining to provide the arrival prediction service based on the one or more predicted delivery metrics meet the one or more thresholds, provide the arrival prediction service for the request, wherein the arrival prediction service guarantees delivery of the order within a time window, wherein providing the arrival prediction service comprises:
      transmitting instructions to the client device associated with the user to update the graphical user interface of the client application to include a user interface element describing the time window, wherein the instructions further cause the client device to display the updated graphical user interface through a display of the client device.

\* \* \* \* \*